United States Patent
Hosonuma

[11] Patent Number: 6,108,567
[45] Date of Patent: Aug. 22, 2000

[54] RADIO COMMUNICATION APPARATUS HAVING A HANDS-FREE COMMUNICATION MODE

[75] Inventor: Yoshimasa Hosonuma, Tokyo, Japan

[73] Assignee: NEC Corporation, Tokyo, Japan

[21] Appl. No.: 09/087,641

[22] Filed: May 29, 1998

[30] Foreign Application Priority Data

May 30, 1997 [JP] Japan ................................ 9-142541

[51] Int. Cl.$^7$ ................................................. H04B 1/38
[52] U.S. Cl. ........................ 455/569; 704/224; 455/253.1
[58] Field of Search ....................... 455/569, 570, 455/550, 345, 99, 575, 90, 563, 232.1, 253.2; 379/420, 432, 388; 704/224, 225

[56] References Cited

U.S. PATENT DOCUMENTS

| 5,036,532 | 7/1991 | Metroka et al. ........................ 455/569 |
| 5,588,041 | 12/1996 | Meyer, Jr. et al. ...................... 455/569 |
| 5,734,987 | 3/1998 | Shiono et al. ........................... 455/570 |

FOREIGN PATENT DOCUMENTS

| 3-198540 | 8/1981 | Japan . |
| 61-82541 | 4/1986 | Japan . |
| 62-43941 | 2/1987 | Japan . |
| 62-287730 | 12/1987 | Japan . |
| 2-21846 | 2/1990 | Japan . |
| 3-212045 | 9/1991 | Japan . |
| 4-137953 | 5/1992 | Japan . |
| 4-246925 | 9/1992 | Japan . |
| 4-368246 | 12/1992 | Japan . |
| 5-20450 | 3/1993 | Japan . |
| 5-105005 | 4/1993 | Japan . |
| 5-95314 | 4/1993 | Japan . |
| 6-252821 | 9/1994 | Japan . |
| 95-377273/ 199549 | of 1995 | Japan . |
| 7-250144 | 9/1995 | Japan . |
| 3022876 | 1/1996 | Japan . |
| 8-46678 | 2/1996 | Japan . |
| 8-181765 | 7/1996 | Japan . |
| 8-317042 | 11/1996 | Japan . |
| 9-130466 | 5/1997 | Japan . |

*Primary Examiner*—Dwayne D. Bost
*Assistant Examiner*—Tracy M. Legree
*Attorney, Agent, or Firm*—McGinn & Gibb, P.C.

[57] ABSTRACT

A communication apparatus of the present invention has a hands-free communication capability and is applicable to, but not limited to, a motor vehicle. Only if the apparatus is connected to, e.g., an on-board cigar-lighter, hands-free communication can be held. This eliminates the need for a hands-free unit, an outside microphone and other extra parts conventionally mounted on the vehicle to implement a hands-free feature.

39 Claims, 10 Drawing Sheets

RADIO COMMUNICATION APPARATUS HAVING A HANDS-FREE COMMUNICATION MODE

BACKGROUND OF THE INVENTION

The present invention relates to a radio communication apparatus with a hands-free communication capability for allowing the user of the apparatus to converse without holding it by hand and, more particularly, to a hands-free radio communication apparatus applicable to a motor vehicle.

Today, persons driving motor vehicles while speaking on portable telephones are not rare. However, driving a motor vehicle with one hand while holding a handset with the other hand is not desirable from the safety standpoint. Some different measures have been proposed against such a dangerous situation and include a portable telephone having a hands-free communication capability. A hands-free portable telephone allows a person to converse without holding a handset, i.e., while holding a steering wheel with both hands.

On-board portable telephones with a hands-free communication capability are disclosed in, e.g., Japanese Patent Laid-Open Publication No. 4-368246 and Japanese Utility Model Laid-Open Publication No. 5-20450. A problem with the conventional hands-free portable telephones including ones taught in the above documents is that at the time of a call incoming, the operator of a motor vehicle must press some button to answer the call while steering the vehicle with one hand at great risk. Another problem is that the hands-free feature is not achievable without arranging some extra parts in a passenger compartment beforehand. In addition, such extra parts arranged in the limited space of a passenger compartment would obstruct the operator's steering operation.

Technologies relating to the present invention are also disclosed in, e.g., Japanese Patent Laid-Open Publication Nos. 62-43941, 62-287730, 3-198540, 4-246925, 5-105005, 7-250144, and 8-46678.

SUMMARY OF THE INVENTION

It is therefore an object of the present invention to provide a radio communication apparatus applicable to a motor vehicle and capable of automatically answering a call incoming to thereby allow the operator of the vehicle to start conversation without performing any operation.

It is another object of the present invention to provide a radio communication apparatus applicable to a motor vehicle and insuring safe hands-free conversation without resorting to extra parts including a hands-free unit and an outside microphone.

In accordance with the present invention, a radio communication apparatus includes a recognizing circuit for recognizing power input from an outside power source to the apparatus, and a controller for automatically setting up a hands-free communication mode when the recognizing circuit recognizes the power input from the outside power source.

Also, in accordance with the present invention, a radio communication apparatus includes a recognizing circuit for recognizing power input from an outside power source to the apparatus. An amplifying circuit amplifies a speech while an outputting circuit outputs a speech level amplified by the amplifying circuit. A controller controls the speech amplification degree of the amplifying circuit on the basis the speech level when the recognizing circuit recognizes the power input from the outside power source. A setting section sets up a function of automatically answering a call incoming when the recognizing circuit recognizes the power input from the outside power source.

Further, in accordance with the present invention, a communication method for a radio communication apparatus has the steps of recognizing whether or not power is input from an outside power source to the apparatus, setting up a hands-free communication mode, setting up a function of automatically answering a call incoming, detecting a speech level amplified by an amplifying circuit, and controlling the amplification degree of the amplifying circuit on the basis of the speech level.

Moreover, in accordance with the present invention, a communication method for a radio communication apparatus has the steps of recognizing whether or not power is input from an outside power source to the apparatus, setting up a hands-free communication mode, detecting a receipt speech level amplified by a receipt speech amplifying circuit, detecting a transmission speech level amplified by a transmission speech amplifying circuit, reducing the amplification degree of the transmission speech amplifying circuit relatively when the receipt transmission speech level rises, and reducing the amplification degree of the receipt speech amplifying circuit relatively when the transmission speech level rises.

BRIEF DESCRIPTION OF THE DRAWINGS

The above and other objects, features and advantages of the present invention will become apparent from the following detailed description taken with the accompanying drawings in which.

In the figures, identical reference numerals denote identical structural elements.

DESCRIPTION OF THE PREFERRED EMBODIMENTS

Figure 1:
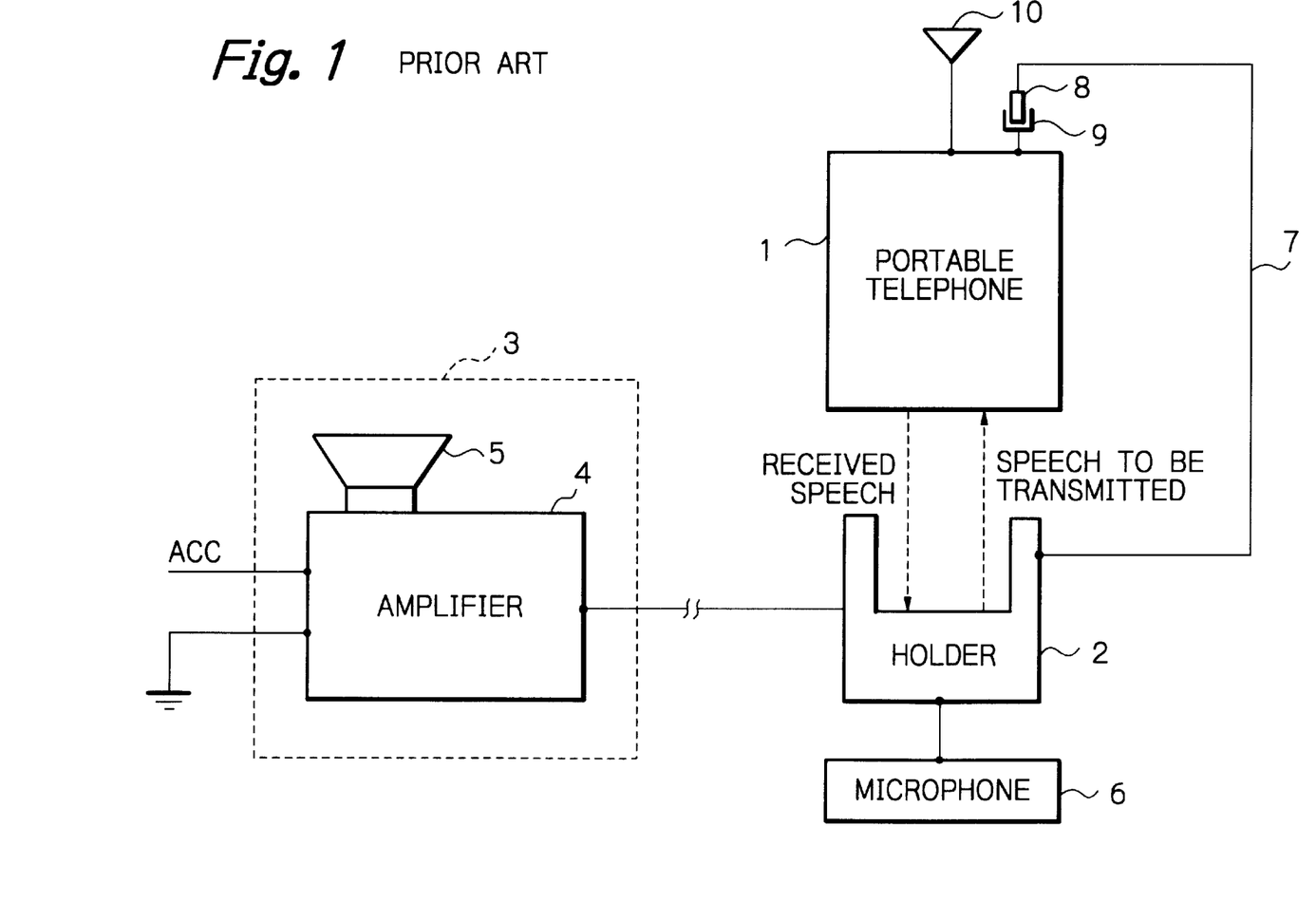
FIG. 1 is a block diagram schematically showing a conventional hands-free communication apparatus for a motor vehicle.

To better understand the present invention, brief reference will be made to a conventional hands-free radio communication apparatus for use on a motor vehicle, shown in FIG. 1. The apparatus to be described in taught in Japanese Patent Laid-Open Publication No. 4-368246 mentioned earlier. As shown, the apparatus includes a portable telephone 1 including an antenna 10. The telephone 1 is mounted on a holder 2 located in front of the driver's seat of a motor vehicle. A cord 7 extends out from the holder 2 and has a jack 8 at its end. When the jack 8 is connected to an earphone/microphone terminal 9 included in the telephone 1, a communication can be held in a hands-free mode. A hands-free unit 3 is arranged outside of the telephone 10 and includes an amplifier 4 and a speaker 5. A speech signal coming in through the antenna 10 is amplified by the amplifier 4 and output via the speaker 5 in the form of a speech. On the other hand, a speech 6 input to a microphone 6 also arranged outside of the telephone 1 is sent via the antenna 10.

Figure 2:
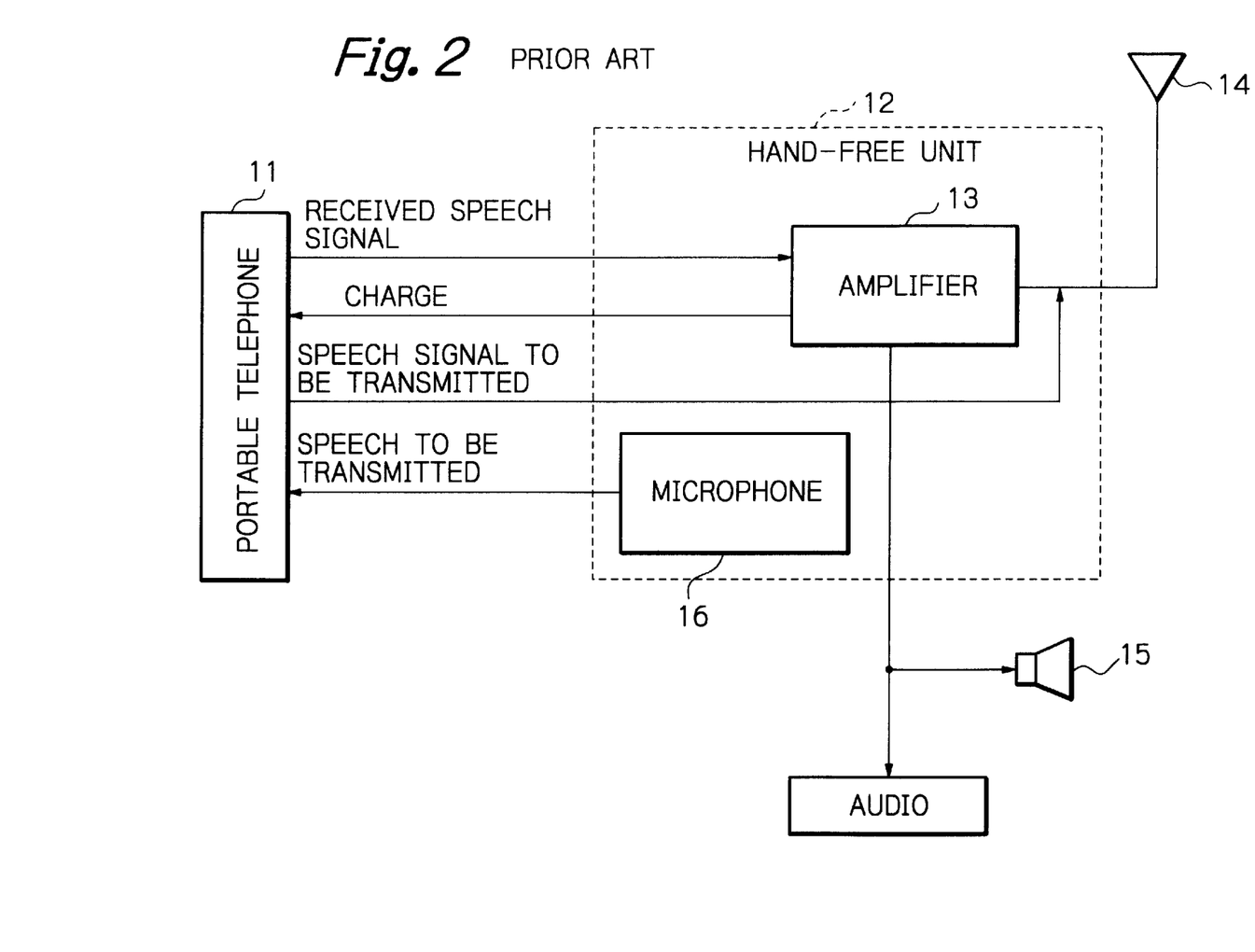
FIG. 2 is a block diagram schematically sowing another conventional hands-free communication apparatus for a motor vehicle.

FIG. 2 shows another conventional hands-free communication apparatus for use on a motor vehicle and disclosed in Japanese Utility Model Laid-Open Publication No. 5-20450 also mentioned earlier. As shown, a portable telephone 11 is connected to a hands-free unit 12 including an antenna 14, an amplifier 13, and a microphone 16. A speech signal coming in through the antenna 14 is processed by the telephone 121 and then output via an on-board speaker 15 via the amplifier 13 in the form of a speech. A speech input to the microphone 16 is sent via the telephone 11 and antenna 14.

The above conventional configurations have some problems left unsolved, as discussed previously.

Figure 3:
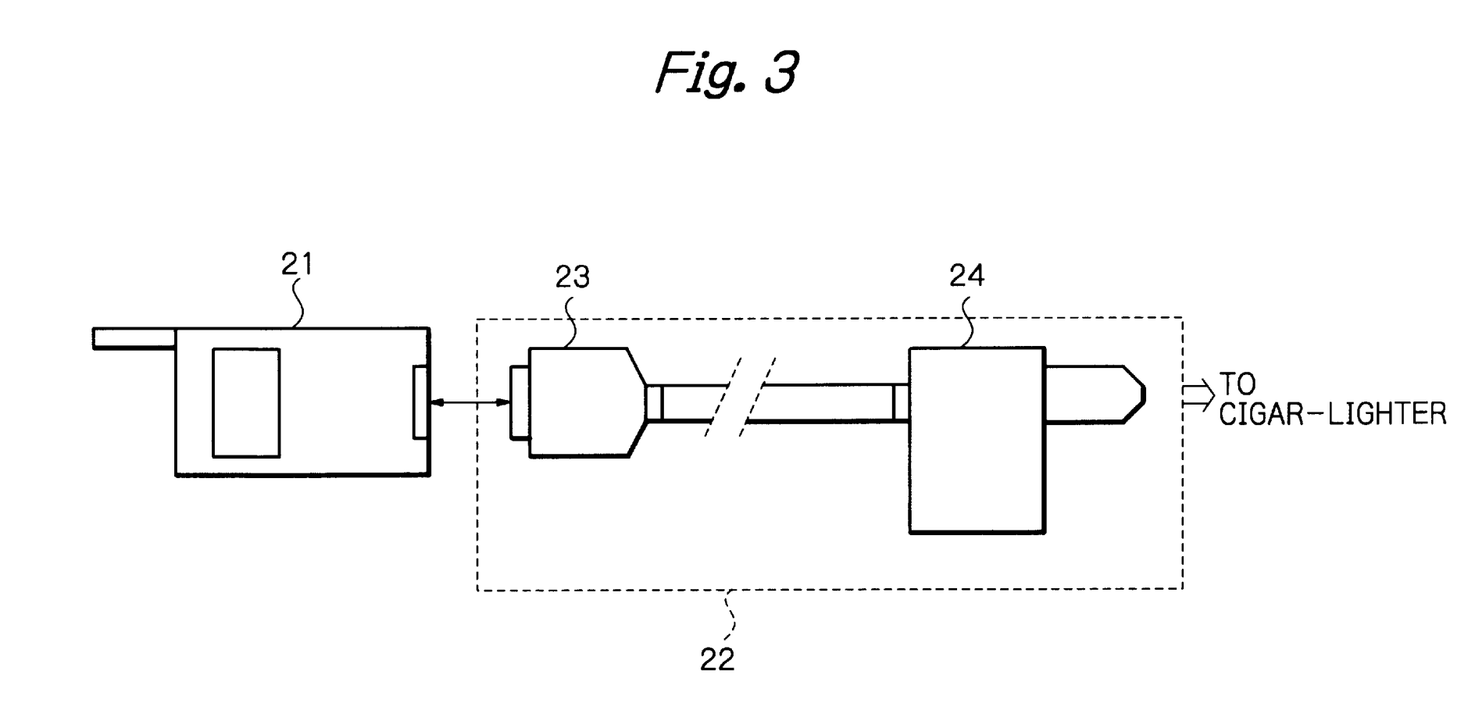
FIG. 3 shows a radio communication apparatus embodying the present invention and connected to an on-board cigar-lighter adapter by way of example.

Referring to FIG. 3, a hands-free radio communication apparatus embodying the present invention is shown and implemented as a portable telephone by way of example. As shown, the telephone, generally 21, is connected to, e.g., an on-board cigar-lighter adapter by a cable. In the illustrative embodiment, the cable is implemented by a DC rapid charger 22 including a socket 23 and a cigar-lighter socket 24. When the socket 23 and cigar-lighter socket 24 are respectively connected to the telephone 21 and cigar-lighter adapter, power is supplied from an on-board DC power source to the telephone 21 via the cigar-lighter.

Figure 4:
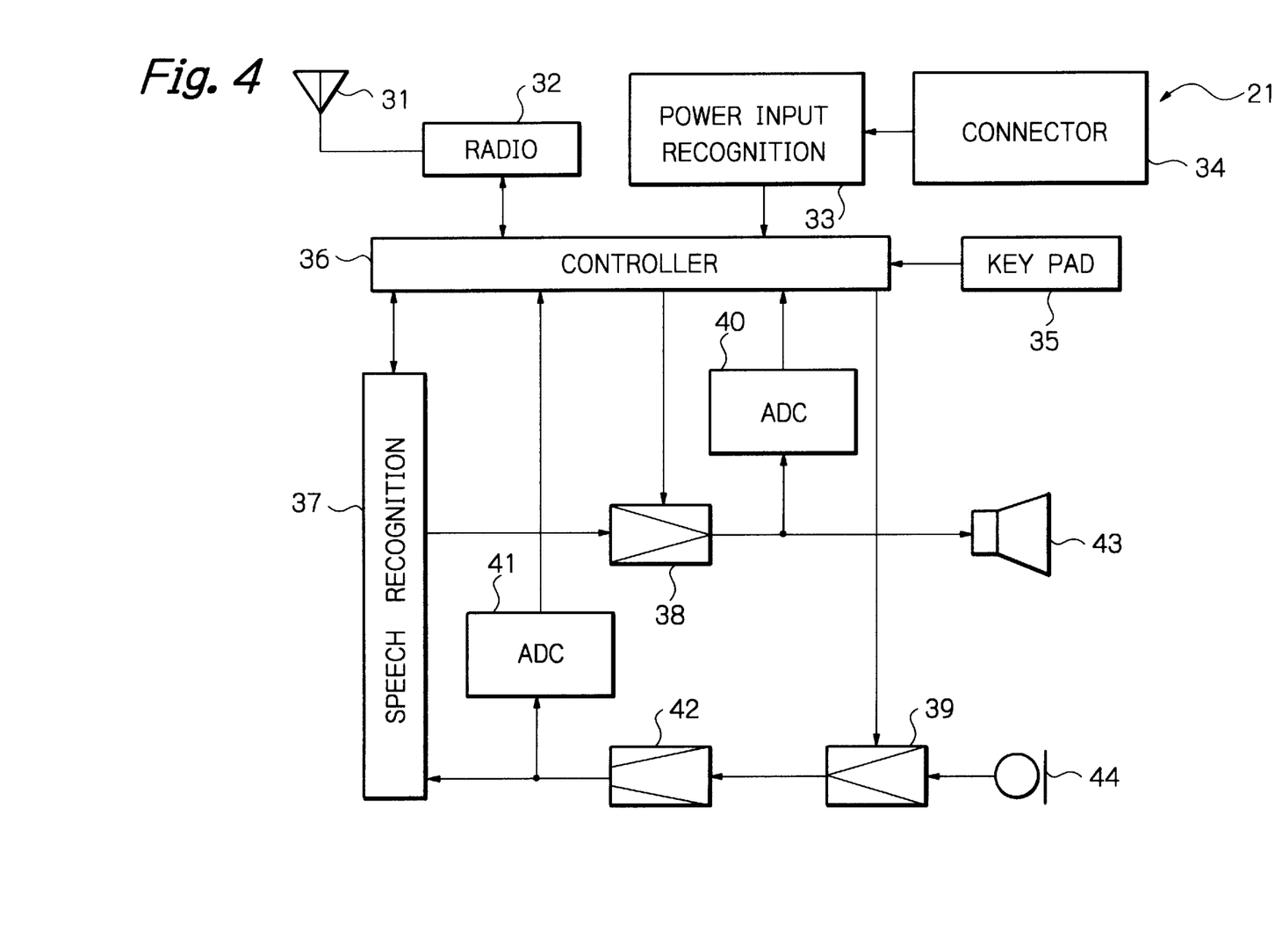
FIG. 4 is a block diagram schematically showing circuitry representative of the embodiment shown in FIG. 3.

The circuitry of the telephone 21 is shown in FIG. 4 specifically. As shown, the telephone 21 includes a radio 32 for receiving a radio signal sent from a base station, not shown, via an antenna 31. A connector 34 playing the role of an interface is connected to the DC rapid charger 22, so that the DC power of the on-board power source can be fed to the telephone via the cigar-lighter. A power input recognition 33 recognizes the input of the DC power from the cigar-lighter. A key pad 35 is accessible for various purposes, e.g., for inputting a telephone number and setting a function of automatically answering a call incoming. A speech recognition 37 digitizes a received signal and a signal input via a transmitting section 44 and may be implemented by a digital signal processor. A receipt speech amplification 38 amplifies a received speech and feeds the amplified speech to a receiving section 43. Likewise, a transmission speech amplification 39 amplifies a speech input via the transmitting section 44 to be transmitted. A filter 42 filters out noise around the vehicle and other noise contained in the speech to be sent, i.e., takes in only the speech band signal. Analog-to-digital converters (ADC) 40 and 41 respectively feed the speech levels amplified by the amplifications 38 and 39 to a controller 36.

When the power input recognition 33 determines that the DC power is input to the telephone 21 via the cigar-lighter, the controller 36 automatically sets up a hands-free communication mode, i.e., increases the amplification degree of the receipt speech amplification 38 and that of the transmission speech amplification 39. At the same time, the controller 36 so adjusts the amplification degrees of the amplifications 38 and 39 as to avoid howling on the basis of speech levels output from the ADCs 40 and 41. Specifically, when a received speech is output, the controller 36 reduces the amplification degree of the amplification 39 relatively because the speech level output from the ADC 40 rises. When a speech to be sent is output, the controller 36 reduces the amplification degree of the amplification 38 relatively because the speech level output from the ADC 41 rises. In addition, the controller 36 automatically answers a call incoming if so set by the operator of the vehicle beforehand.

Figure 5:
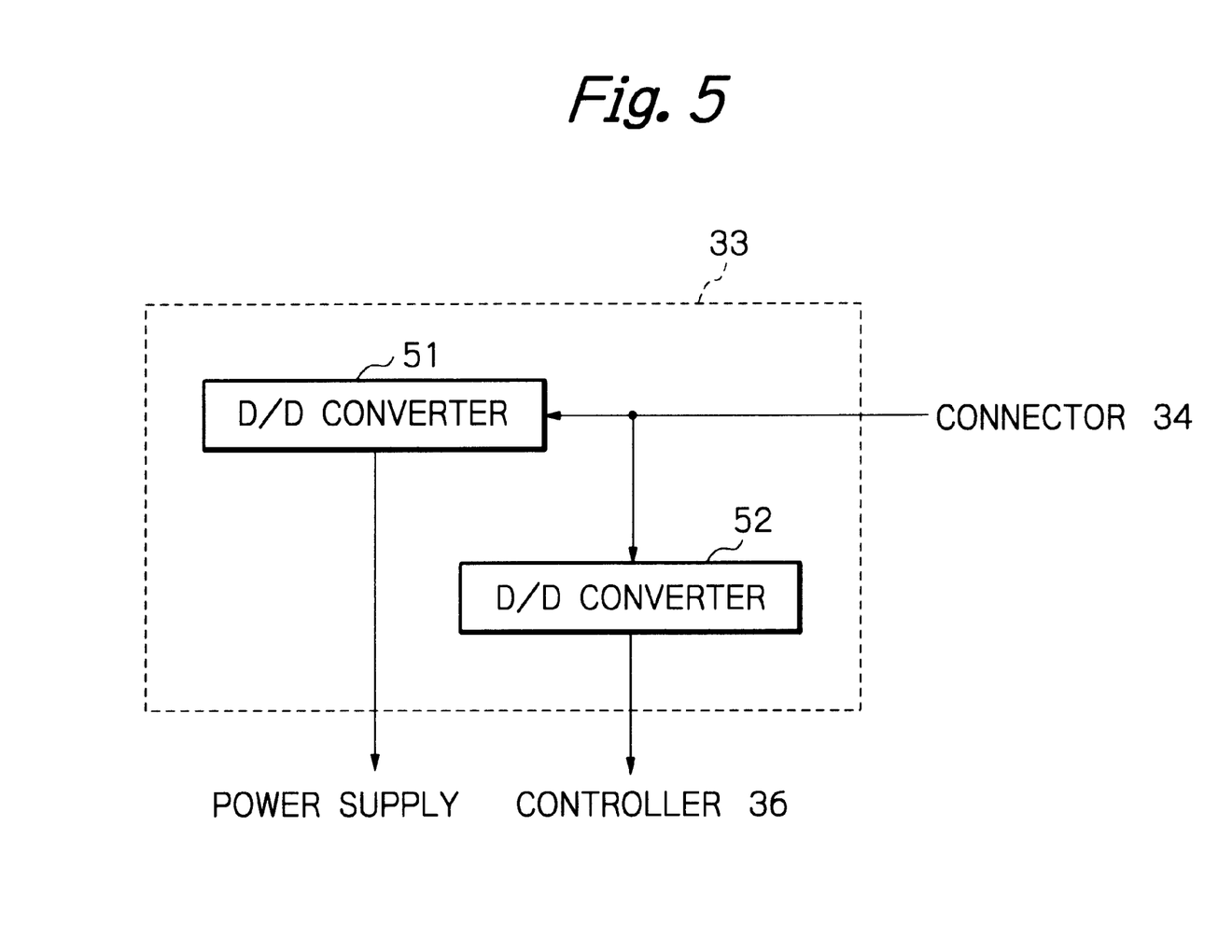
FIG. 5 is a block diagram schematically showing a power input recognizing section included in the embodiment of FIG. 3.

FIG. 5 shows a specific configuration of the power input recognition 33, FIG. 4. When the telephone 21 is not connected to the cigar-lighter adapter, a battery, not shown, held in the telephone 21 powers the telephone 21 as usual. When the telephone 21 is connected to the cigar-lighter adapter, the DC power is fed from the adapter to the telephone 21 via the connector 34. The power input recognition 33 has DD converters 51 and 52 connected to the connector 34, as illustrated. The D/D converters 51 and 52 each converts the DC voltage, e.g., 12 V input via the connector 34 to a voltage, e.g., 3.6 V necessary for the telephone 21. If the converted voltage of 3.6 V is higher than a preselected reference voltage, e.g., 2 V, then the D/D converter 52 determines that the telephone 21 is connected to the cigar-lighter adapter and supplied with power therefrom.

Figure 6:
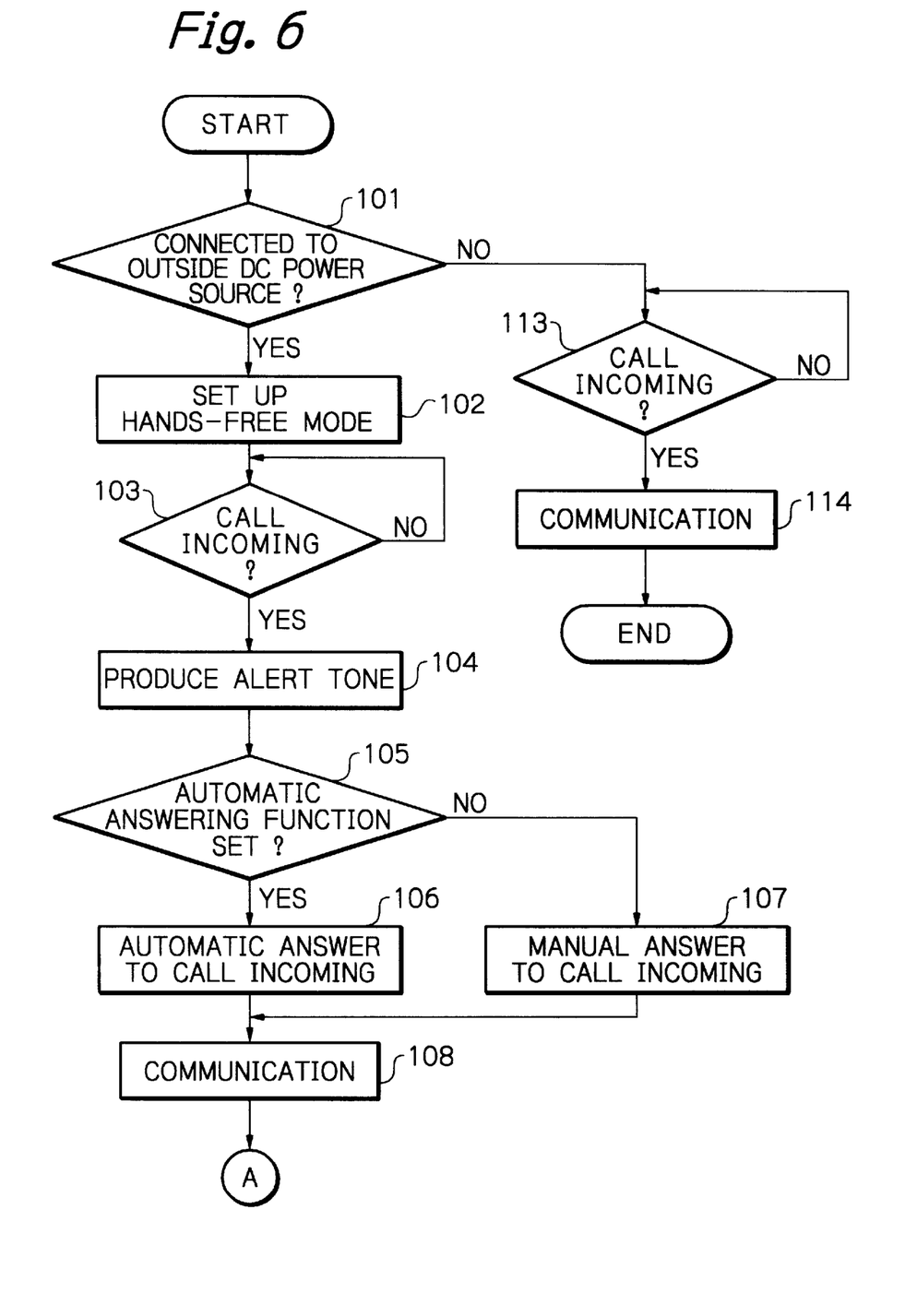
FIGS. 6 and 7 are flowcharts demonstrating a specific operation of the embodiment of FIG. 3.
Figure 7:
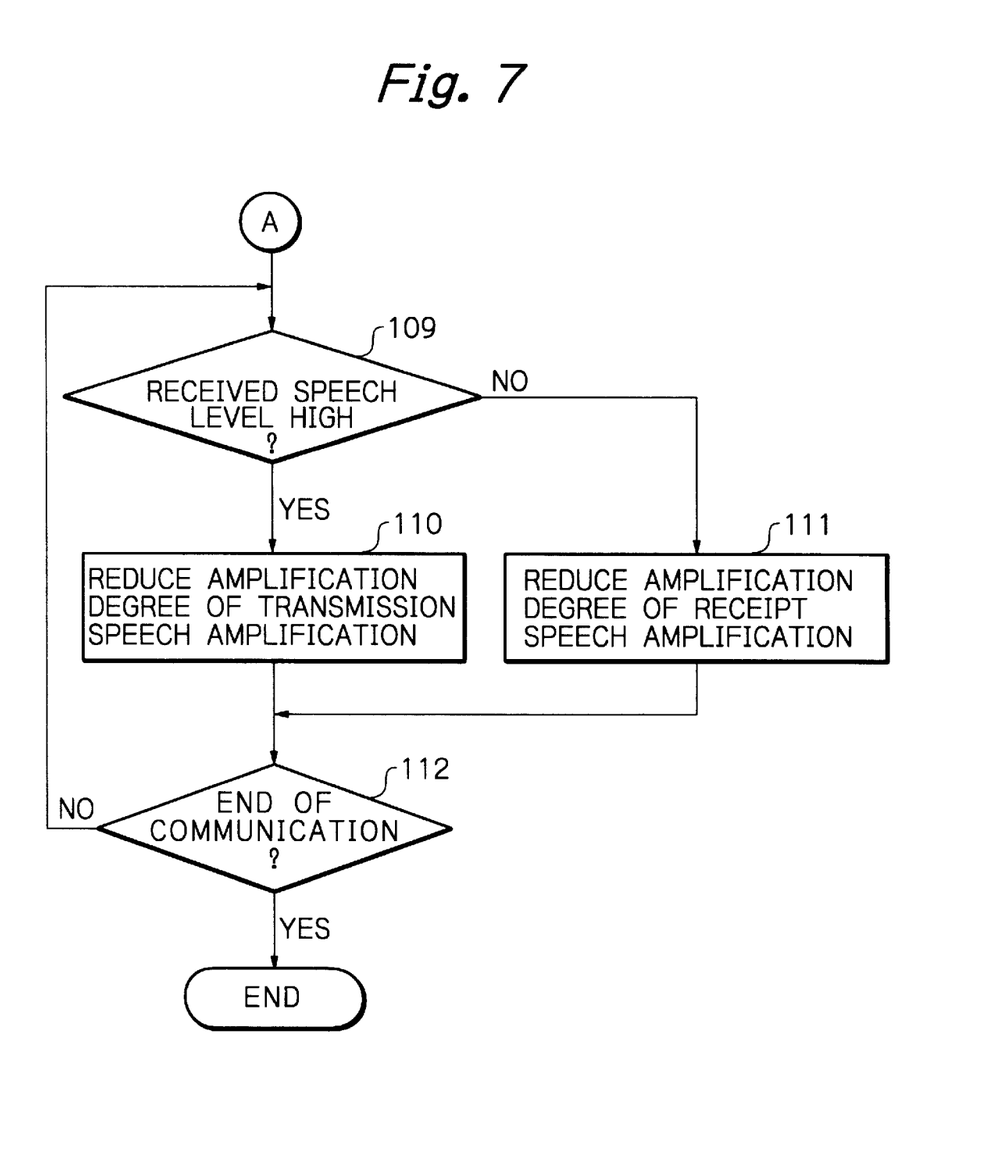

A specific operation of the telephone 1 will be described with reference to FIGS. 6 and 7. As shown, when the telephone 21 is connected to the cigar-lighter adapter via the DC rapid charger 22, the D/D converter 52 of the power input recognition 33 recognizes the input of the outside DC power (YES, step 101). As a result, the controller 36 automatically sets up the hands-free communication mode, i.e., increases the amplification degrees of the two amplifications 38 and 39 (step 102). In the event of an incoming call (YES, step 103), the controller 36 causes an alert tone to be output (step 104). At this instant, the controller 36 determines whether or not the function of automatically answering a call incoming is selected by the operator of the vehicle beforehand (step 105). If the answer of the step 105 is positive (YES), the controller 36 causes the alert tone to be output several times and then allows communication to be automatically held on the telephone 21 (step 106). If the answer of the step 105 is negative (NO), the controller 36 causes the alert tone to be repeatedly output until the operator presses an answer button (manual answer) (step 107).

In the event of communication (step 108), the controller 36 adjusts the amplification degrees of the two amplifications 38 and 39 to adequate ones in order to avoid howling. Specifically, the controller 36 determines whether or not the speech level output from the ADC 40 is relatively high (step 109). When a received speech is output, the controller 36 determines that the received speech level, e.g., 24 dB is relatively high (YES, step 109) and reduces the amplification degree of the transmission speech amplification 39 to, e.g., 12 dB in accordance with the receipt speech level (step 110). As a result, only the received speech is amplified and output. When speech to be sent is output, the controller 36 determines that the transmission speech level, e.g., 24 dB, is relatively high (NO, step 109) and reduces the amplification degree of the receipt speech amplification 38 to, e.g., 12 dB in accordance with the transmission speech level (step 111). As a result, only the speech to be sent is amplified and transmitted. Such correction of amplification degrees is repeated until the end of communication and ends at the end of communication (step 112).

Assume that the D/D converter 52 of the power input recognition 33 does not recognize the input of the outside DC power, i.e., the connector 34 is not connected to the cigar-lighter adapter or the on-board DC power source is not connected via the cigar-lighter. Then, the controller 36 does not set up the hands-free communication mode, but allows the operator to press the answer button (step 113) and hold communication (step 114) as usual. At this instant, the receipt speech level and transmission speech level are, e.g., 18 dB. In this case, it is preferable to alert the operator to the above condition via a display or a sounder, not shown.

As stated above, the illustrative embodiment corrects the amplification degrees of the two amplifications 38 and 39 in accordance with the receipt speech level and transmission speech level. This allows communication to be held at adequate speech levels at all times.

Figure 8:
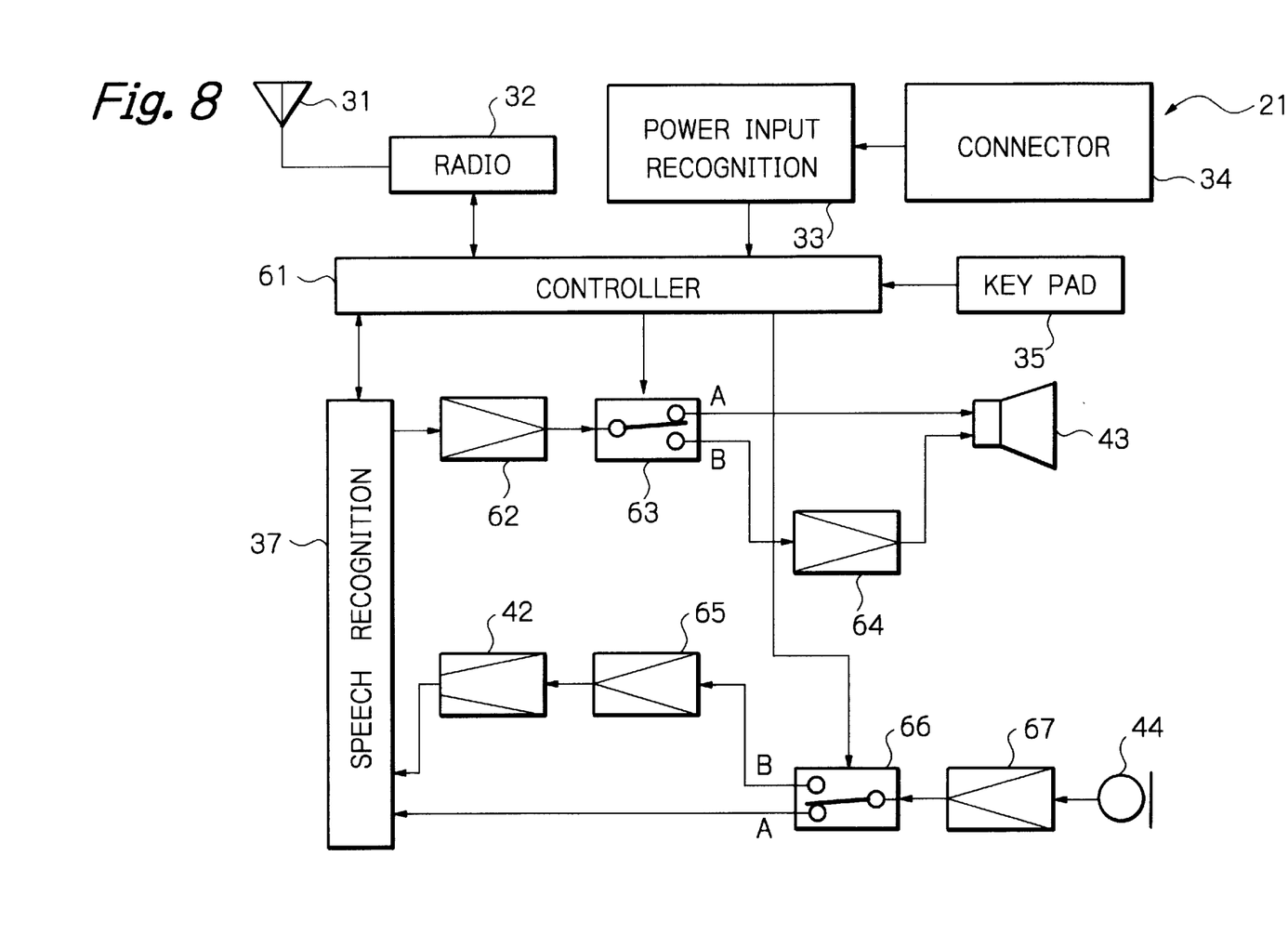
FIG. 8 is a block diagram schematically showing an alternative embodiment of the present invention.

Reference will be made to FIG. 8 for describing an alternative embodiment of the present invention. As shown, this embodiment differs from the previous embodiment in that the ADCs 40 and 41 and amplifications 38 and 39 are omitted, and in that two switches 63 and 66, two receipt speech amplifications 62 and 64 and two transmission speech amplifications 65 and 67 are added.

The receipt speech amplification 62 amplifies a received speech and feeds the amplified speech to the switch 63. The transmission speech amplification 67 amplifies a speech input via the transmitting section 44. The receipt speech amplification 64 amplifies a received speech such that the operator of the vehicle can hear it even at a position remote from the telephone 21. The transmission speech amplification 65 amplifies a low speech uttered at a position remote from the telephone 21 to a speech which can be heard. The switches 63 and 66 each selects one of its terminals A and B in response to a control signal fed from a controller 61. The controller 61 automatically sets up the hands-free communication mode when the power input recognition 33 recognizes the input of the outside DC power via the cigar-lighter. Specifically, when a received speech is output, the controller 61 causes the switch 63 to select the terminal B and causes the switch 66 to select the terminal A. When a speech to be transmitted is output, the controller 61 causes the switches 63 and 66 to select the terminals A and B, respectively. In addition, the controller 61 automatically answers a call incoming if so set by the operator of the vehicle beforehand. As for the rest of the construction, this embodiment is identical with the previous embodiment.

Figure 9:
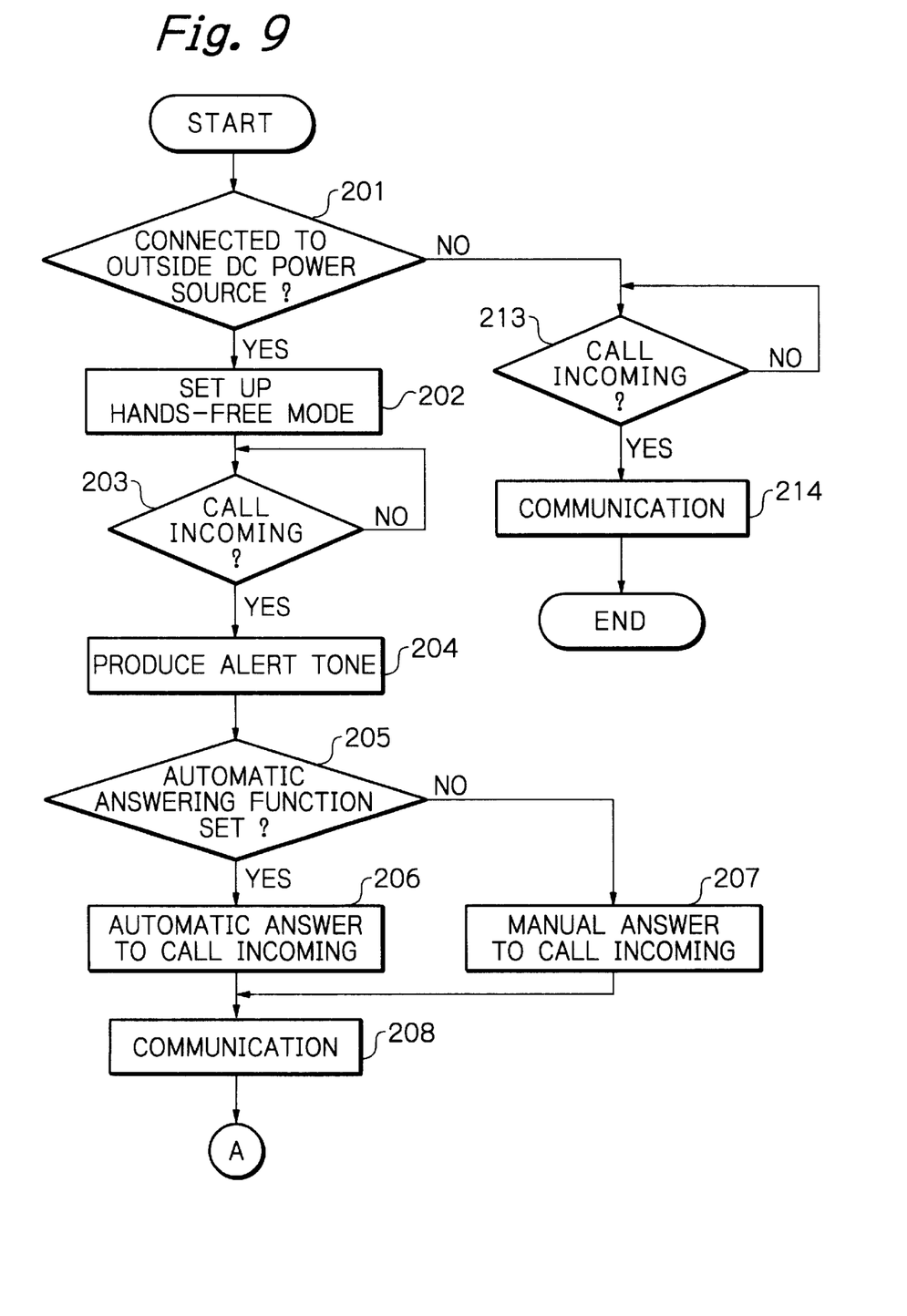
FIGS. 9 and 10 are flowcharts demonstrating a specific operation of the embodiment shown in FIG. 8.
Figure 10:
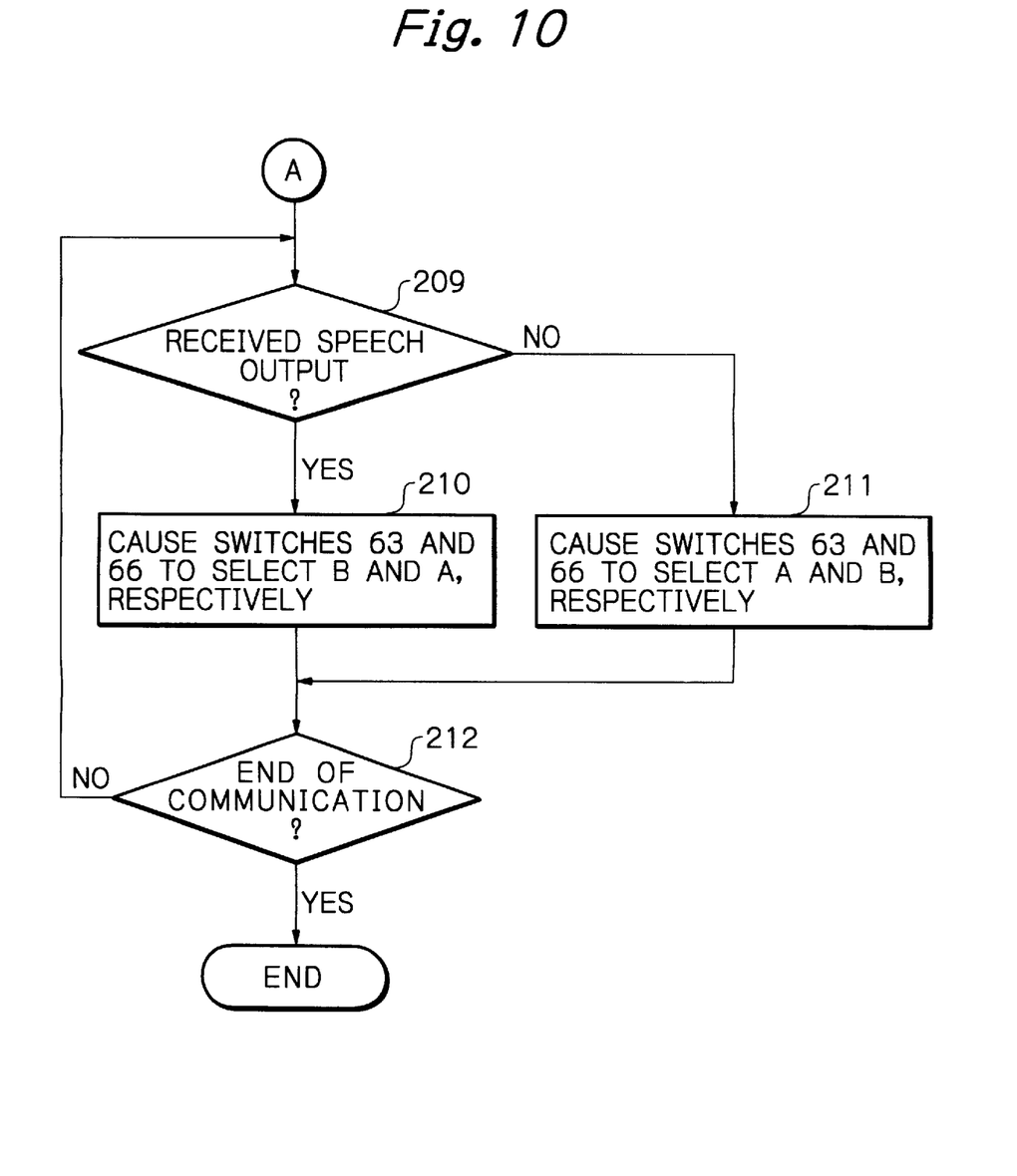

A specific operation of the above embodiment will be described with reference to FIGS. 9 and 10. In FIGS. 9 and 10, steps 201–208, 213 and 214 are respectively identical with the steps 101–108, 113 and 114 of FIGS. 6 and 7 and will not be described specifically in order to avoid redundancy.

In the event of communication (step 208), the controller 61 operates the switches 63 and 66 in order to avoid howling (step 209). Specifically, when a received speech is output, as determined by the speech recognition 37 (YES, step 209), the controller 61 causes the switches 63 and 66 to select the terminals B and A, respectively (step 210). In this condition, a received speech is amplified to a speech level which the operator or user can hear even at a position remote from the telephone 21, e.g., 24 dB. On the other hand, when a received speech is not output, as also determined by the speech recognition 37 (NO, step 209), the controller 61 causes the switches 63 and 66 to select the terminals A and B, respectively (step 211). As a result, even a low speech uttered at a position remote from the telephone 21 is amplified to a level which can be heard, e.g., 24 dB. Such control over the switches 63 and 66 is repeated until the end of communication and ends at the end of communication (step 212).

When the hands-free communication mode is not set up, both the receipt speech level and transmission speed level are, e.g., 18 dB in the step 214.

As stated above, in the illustrative embodiment, the switches 63 and 66 each is connected to an amplifier having a particular amplification degree, depending on whether or not a received speech is output. Therefore, two different speech levels are available with each of a received speech and a speech to be transmitted.

In summary, it will be seen that the present invention provides a radio communication apparatus having various unprecedented advantages, as enumerated below.

(1) Only if the apparatus is connected to, e.g., a cigar-lighter mounted on a motor vehicle, hands-free communication can be held. This eliminates the need for a hands-free unit, an outside microphone and other extra parts conventionally arranged on the vehicle.

(2) When the apparatus is connected to the cigar-lighter by a cable, a hands-free communication mode is automatically set up and makes it needless for the operator of the vehicle to perform any setting operation while driving the vehicle at great risk.

(3) The apparatus automatically answers a call incoming and frees the operator from extra operation including the operation of an answer button. This is also desirable from the safety standpoint.

Various modifications will become possible for those skilled in the art after receiving the teachings of the present disclosure without departing from the scope thereof. For example, while the embodiments each sets up the hands-free communication mode on the recognition of the input of the outside DC power, the operator or user may set it up by operating the key pad. However, should the operator connect the telephone to the cigar-lighter while forgetting to set up the hands-free communication mode, hands-free communication would not be available. In light of this, it is preferable to alert the user to such an incomplete condition via a display or a sounder.

The embodiment described with reference to FIGS. 4–7 corrects the amplification degree of either one of two amplifying circuit in accordance with the level of a received speech. If desired, the level of a received speech may be replaced with the level of a speech to be transmitted. Likewise, in the embodiment described with reference to FIGS. 8–10, the switches may be controlled, depending on whether or not a speech to be transmitted is output.

In the illustrative embodiments, communication automatically begins when the function of automatically answering a call incoming is set beforehand. Alternatively, the automatic answering function, like the hands-free mode, may be automatically set up when the input of the outside DC power is recognized by the power input recognition. This will automatically start communication in response to a call incoming and will thereby avoid danger during driving more positively.

Of course, the outside DC power may be fed from any desired on-board electrical part other than the cigar-lighter.

What is claimed is:

1. A radio communication apparatus comprising:

recognizing means for recognizing power input from an outside power source to said radio communication apparatus; and control means for automatically setting up a hands-free communication mode when said recognizing means recognizes the power input from the outside power source, said hands-free mode being a mode in which an amplification level is adjusted based on one of a received speech level and a transmitted speech level.

2. An apparatus as claimed in claim 1, further comprising setting means for setting up a function of automatically answering a call incoming when said recognizing means recognizes the power input from the outside power source.

3. An apparatus as claimed in claim 2, wherein said control means and said setting means are set by a user of said apparatus beforehand.

4. An apparatus as claimed in claim 1, wherein said recognizing means comprises a D/D converter.

5. An apparatus as claimed in claim 1, wherein said control means and said setting means are set by a user of said apparatus beforehand.

6. An apparatus as claimed in claim 1, wherein said recognizing means recognizes that said apparatus is connected to an on-board cigar-lighter by a cable.

7. An apparatus as claimed in claim 1, wherein said apparatus comprises a portable telephone.

8. A radio communication apparatus comprising:
   recognizing means for recognizing power input from an outside power source to said radio communication apparatus;
   amplifying means for amplifying a speech;
   outputting means for outputting a speech level amplified by said amplifying means;
   control means for controlling a speech amplification degree of said amplifying means on the basis of the speech level when said recognizing means recognizes the power input from the outside power source; and
   setting means for setting up a function of automatically answering a call incoming when said recognizing means recognizes the power input from the outside power source.

9. An apparatus as claimed in claim 8, wherein said outputting means comprises an analog-to-digital converter.

10. An apparatus as claimed in claim 8, wherein said recognizing means comprises a D/D converter.

11. An apparatus as claimed in claim 8, wherein said control means and said setting means are set by a user of said apparatus beforehand.

12. An apparatus as claimed in claim 8, wherein said recognizing means recognizes that said apparatus is connected to an on-board cigar-lighter by a cable.

13. An apparatus as claimed in claim 8, wherein said apparatus comprises a portable telephone.

14. A radio communication apparatus comprising:
    recognizing means for recognizing power input from an outside power source to said radio communication apparatus;
    first amplifying means for amplifying a received speech;
    second amplifying means for amplifying a speech to be transmitted;
    first outputting means for outputting a receipt speech level amplified by said first amplifying means;
    second outputting means for outputting a transmission speech level amplified by said second amplifying means;
    control means for reducing, after said recognizing means has recognized the power input from the outside power source, a speech amplification degree of said second amplifying means relatively when the receipt speech level rises, said control means further for reducing, after said recognizing means has recognized the power input from the outside power source, a speech amplification degree of said first amplifying means relatively when the transmission speech level rises; and
    setting means for setting up a function of automatically answering a call incoming when said recognizing means recognizes the power input from the outside power source.

15. An apparatus as claimed in claim 14, wherein said first outputting means and said second outputting means each comprises an analog-to-digital converter.

16. An apparatus as claimed in claim 14, wherein said recognizing means comprises a D/D converter.

17. An apparatus as claimed in claim 14, wherein said control means and said setting means are set by a user of said apparatus beforehand.

18. An apparatus as claimed in claim 14, wherein said recognizing means recognizes that said apparatus is connected to an on-board cigar-lighter by a cable.

19. An apparatus as claimed in claim 14, wherein said apparatus comprises a portable telephone.

20. A radio communication apparatus comprising:
    recognizing means for recognizing power input from an outside power source to said radio communication apparatus;
    first amplifying means for amplifying a speech;
    second amplifying means for amplifying a speech with a higher amplification degree than said first amplifying means;
    decision means for determining whether a speech is output;
    control means for causing, when said recognizing means recognizes the power input from the outside power source, said second amplifying means to control a speech amplifying degree on the basis of a result of said decision means and based on a speech level of said speech being output; and
    setting means for setting up a function of automatically answering a call incoming when said recognizing means recognizes the power input from the outside power source.

21. An apparatus as claimed in claim 20, wherein said recognizing means comprises a D/D converter.

22. An apparatus as claimed in claim 20, wherein said control means and said setting means are set by a user of said apparatus beforehand.

23. An apparatus as claimed in claim 20, wherein said recognizing means recognizes that said apparatus is connected to an on-board cigar-lighter by a cable.

24. An apparatus as claimed in claim 20, wherein said apparatus comprises a portable telephone.

25. A radio communication apparatus comprising:
    recognizing means for recognizing power input from an outside power source to said radio communication apparatus;
    first amplifying means for amplifying a received speech;
    second amplifying means for amplifying a speech to be transmitted;
    third amplifying means for amplifying the received speech with a higher amplification degree than said first amplifying means;
    fourth amplifying means for amplifying the speech to be transmitted with a higher amplification degree than said second amplifying means;
    decision means for determining whether a received speech is output;

control means for causing, after said recognizing means has recognized the power input from the outside power source, said first amplifying means and said third amplifying means to amplify the received speech when said decision means determines that said received speech is output, said control means further for causing, after said recognizing means has recognized the power input from the outside power source, said second amplifying means and said fourth amplifying means to amplify the speech to be transmitted when said decision means determines that a received speech is not output; and setting means for setting up a function of automatically answering a call incoming when said recognizing means recognizes the power input from the outside power source.

26. An apparatus as claimed in claim 25, wherein said decision means determines whether the speech to be transmitted is output.

27. An apparatus as claimed in claim 25, wherein said recognizing means comprises a D/D converter.

28. An apparatus as claimed in claim 25, wherein said control means and said setting means are set by a user of said apparatus beforehand.

29. An apparatus as claimed in claim 25, wherein said recognizing means recognizes that said apparatus is connected to an on-board cigar-lighter by a cable.

30. An apparatus as claimed in claim 25, wherein said apparatus comprises a portable telephone.

31. A communication method for a radio communication apparatus, comprising:

recognizing whether power is input from an outside power source to said radio communication apparatus;

setting up a hands-free communication mode;

setting up a function of automatically answering a call incoming;

detecting a speech level amplified by an amplifying circuit; and controlling an amplification degree of said amplifying circuit on the basis of the speech level when said radio communication apparatus is in said hands-free communication mode.

32. A method as claimed in claim 31, wherein said radio communication apparatus comprises a portable telephone.

33. A communication method for a radio communication apparatus, comprising:

recognizing whether power is input from an outside power source to said radio communication apparatus;

setting up a hands-free communication mode;

detecting a receipt speech level amplified by a receipt speech amplifying circuit;

detecting a transmission speech level amplified by a transmission speech amplifying circuit;

reducing the amplification degree of said transmission speech amplifying circuit relatively when the radio communication apparatus is in the hands-free communication mode and the receipt transmission speech level rises; and reducing the amplification degree of said receipt speech amplifying circuit relatively when the radio communication apparatus is in the hands-free communication mode and the transmission speech level rises.

34. A method as claimed in claim 33, wherein said radio communication apparatus comprises a portable telephone.

35. A communication method for a radio communication apparatus, comprising:

recognizing whether power is input from an outside power source to said radio communication apparatus;

setting up a hands-free communication mode;

setting up a function of automatically answering a call incoming;

amplifying a speech with a first amplification degree;

amplifying a speech with a second amplification degree higher than said first amplification degree;

determining whether a speech is output; and amplifying if a speech is output, said speech with said second amplification degree when said radio communication apparatus is in said hands-free communication mode, said amplifying being based on a speech level of said speech being output.

36. A method as claimed in claim 35, wherein said radio communication apparatus comprises a portable telephone.

37. A communication method for a radio communication apparatus, comprising:

recognizing whether power is input from an outside power source to said radio communication apparatus;

setting up a hands-free communication mode;

setting up a function of automatically answering a call incoming;

amplifying a received speech with a first amplification degree;

amplifying a speech to be transmitted with a second amplification degree;

amplifying the received speech with a third amplification degree higher than the first amplification degree;

amplifying the speech to be transmitted with a fourth amplification degree higher than the second amplification degree;

determining whether a received speech is output;

amplifying, if a received speech is output, said received speech with said first amplification degree and said third amplification degree; and amplifying, if a received speech is not output, the speech to be transmitted with said second amplification degree and said fourth amplification degree.

38. A method as claimed in claim 37, further comprising determining whether a speech to be transmitted is output.

39. A method as claimed in claim 37, wherein said radio communication apparatus comprises a portable telephone.

\* \* \* \* \*